(12) United States Patent
Pittman et al.

(10) Patent No.: US 12,020,566 B2
(45) Date of Patent: Jun. 25, 2024

(54) MACHINE-LEARNING BASED CONTROL OF TRAFFIC OPERATION

(71) Applicant: Bentley Systems, Incorporated, Exton, PA (US)

(72) Inventors: Mark Eric Pittman, Salt Lake City, UT (US); David Sacharny, Cottonwood Heights, UT (US); Jennifer Cantwell, Cottonwood Heights, UT (US); Gerald Probst, Salt Lake City, UT (US)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 17/664,366

(22) Filed: May 20, 2022

(65) Prior Publication Data

US 2022/0375340 A1    Nov. 24, 2022

Related U.S. Application Data

(60) Provisional application No. 63/191,094, filed on May 20, 2021.

(51) Int. Cl.
*G08G 1/01* (2006.01)
*G06N 20/00* (2019.01)

(52) U.S. Cl.
CPC .......... *G08G 1/0145* (2013.01); *G06N 20/00* (2019.01); *G08G 1/0129* (2013.01); *G08G 1/0133* (2013.01)

(58) Field of Classification Search
CPC .. G08G 1/0145; G08G 1/0129; G08G 1/0133; G06N 20/00

USPC ......................................................... 340/908
See application file for complete search history.

(56) References Cited

U.S. PATENT DOCUMENTS

| | | | |
|---|---|---|---|
| 9,467,839 B1* | 10/2016 | Nishimura | G06F 16/29 |
| 10,490,066 B2 | 11/2019 | Green et al. | |
| 11,128,699 B1* | 9/2021 | Khurrum | G06F 9/45558 |
| 11,250,698 B2* | 2/2022 | Pittman | H04W 4/80 |
| 11,749,109 B2 | 9/2023 | Sharma | |
| 11,783,702 B2 | 10/2023 | Mohamad Alizadeh Shabestary et al. | |

(Continued)

*Primary Examiner* — Kerri L McNally
*Assistant Examiner* — Thang D Tran
(74) *Attorney, Agent, or Firm* — Cesari and McKenna, LLP; James A. Blanchette (57) ABSTRACT

A method of modifying or controlling a highway traffic system may include training a machine learning model using historical traffic data corresponding to a roadway traffic system in which the historical traffic data is indicative of traffic patterns over a historical time interval. The method may include obtaining, by the machine learning model, traffic data corresponding to the roadway traffic system and determining a probability of traffic congestion occurrence based on the obtained traffic data corresponding to the roadway traffic system. The method may include comparing the probability of traffic congestion occurrence to a traffic control probability threshold, and responsive to the probability of traffic congestion exceeding the traffic control probability threshold, adjusting operations associated with one or more traffic controls that correspond to the roadway traffic system. The machine learning model may be retrained after a time interval using the obtained traffic data corresponding to the roadway traffic system.

20 Claims, 8 Drawing Sheets

(56) References Cited

U.S. PATENT DOCUMENTS

| | | | |
|---|---|---|---|
| 2006/0106530 A1* | 5/2006 | Horvitz | G08G 1/0104 340/933 |
| 2013/0063283 A1* | 3/2013 | Kashima | G01C 21/3679 340/988 |
| 2013/0275206 A1* | 10/2013 | Shekhawat | G06Q 30/02 705/14.43 |
| 2014/0278032 A1* | 9/2014 | Scofield | G08G 1/0129 701/118 |
| 2015/0160025 A1* | 6/2015 | Konig | G01C 21/3415 701/410 |
| 2015/0262477 A1* | 9/2015 | Fowe | G08G 1/096716 701/118 |
| 2016/0148267 A1 | 5/2016 | Pittman et al. | |
| 2016/0148507 A1* | 5/2016 | Pittman | G06Q 30/0255 340/917 |
| 2016/0225259 A1* | 8/2016 | Harris | H04W 28/0247 |
| 2016/0284212 A1* | 9/2016 | Tatourian | G08G 1/096775 |
| 2019/0072968 A1* | 3/2019 | Will, IV | G08G 1/0112 |
| 2019/0122546 A1* | 4/2019 | Lu | G08G 1/0133 |
| 2019/0163826 A1* | 5/2019 | Arquero | G06N 20/00 |
| 2019/0270457 A1* | 9/2019 | Chen | H04W 4/027 |
| 2019/0311616 A1* | 10/2019 | Jin | G05D 1/0297 |
| 2019/0331502 A1* | 10/2019 | Fowe | G01C 21/3446 |
| 2020/0005399 A1* | 1/2020 | Takamatsu | B60W 40/09 |
| 2020/0175863 A1* | 6/2020 | Sakurada | G08G 1/0141 |
| 2020/0192386 A1* | 6/2020 | Stenneth | G01C 21/3697 |
| 2020/0226922 A1* | 7/2020 | Hahn | G08G 1/0129 |
| 2020/0234571 A1* | 7/2020 | Narihira | G07C 5/0841 |
| 2020/0234585 A1* | 7/2020 | Bai | G05D 1/0248 |
| 2020/0388150 A1* | 12/2020 | Herson | G08G 1/0129 |
| 2020/0398861 A1* | 12/2020 | Li | B60W 50/10 |
| 2021/0005085 A1* | 1/2021 | Cheng | G08G 1/0141 |
| 2021/0019376 A1* | 1/2021 | Neubauer | G08G 1/0129 |
| 2021/0125078 A1* | 4/2021 | Malhan | G06N 3/042 |
| 2021/0375129 A1* | 12/2021 | Meng | G06N 3/045 |
| 2022/0046032 A1* | 2/2022 | Le | G06N 5/025 |
| 2022/0083027 A1* | 3/2022 | Brooks | G06F 30/18 |
| 2022/0138260 A1* | 5/2022 | Koval | G06F 16/29 707/798 |
| 2022/0139214 A1 | 5/2022 | Pittman et al. | |
| 2022/0188667 A1* | 6/2022 | Burisch | G08G 1/166 |
| 2022/0189304 A1* | 6/2022 | Fujita | G06Q 10/08355 |
| 2022/0217719 A1* | 7/2022 | Beyer | G06N 20/00 |
| 2022/0254249 A1* | 8/2022 | Tel-Or | G06N 3/045 |
| 2022/0284627 A1* | 9/2022 | Johnson | H04N 17/002 |

* cited by examiner

MACHINE-LEARNING BASED CONTROL OF TRAFFIC OPERATION

CROSS-REFERENCE TO RELATED APPLICATIONS

This application claims priority to and the benefit of U.S. Provisional Application No. 63/191,094, filed May 20, 2021, titled MACHINE-LEARNING BASED CONTROL OF TRAFFIC OPERATIONS, which is incorporated herein by reference in its entirety.

BACKGROUND

The present disclosure generally relates to machine-learning based control of traffic operations. The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

A method of modifying or controlling a highway traffic system may include training a machine learning model using historical traffic data corresponding to a roadway traffic system in which the historical traffic data is indicative of traffic patterns over a historical time interval. The method may include obtaining, by the machine learning model, traffic data corresponding to the roadway traffic system and determining a probability of traffic congestion occurrence based on the obtained traffic data corresponding to the roadway traffic system. The method may include comparing the probability of traffic congestion occurrence to a traffic control probability threshold, and responsive to the probability of traffic congestion exceeding the traffic control probability threshold, adjusting operations associated with one or more traffic controls that correspond to the roadway traffic system. The machine learning model may be retrained after a time interval using the obtained traffic data corresponding to the roadway traffic system.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Existing traffic systems are typically controlled manually by a user and/or automatically based on pre-programmed schedules and/or traffic activity. Manual control of transportation and traffic by a user usually entails developing timing plans for traffic signal controllers. Existing automatic controls of transportation and traffic usually include triggering traffic signal controllers in response to detection of vehicles. Such detection methods include vehicles arriving at stop-bar detection mechanisms, such as magnetic loops under a road surface, radar sensors at road intersections, and/or cameras positioned near the road.

The existing traffic systems and control methods are not equipped to optimize traffic flow in a continuous or periodic fashion, and/or including the consideration of higher-level features of the traffic system. For example, while existing automatic traffic controls may consider explicit measures of speed, flow, and density, they do not include measures of dynamic demographic information such as origin-destination, major and minor events (e.g., a sporting events or a hard-braking event). Additionally, they do not consider shifting traffic management goals, such as slowing traffic to prevent cascading incidents, increasing probability of accidents due to external events, and priority access into the road way. As such, existing traffic systems do not account for traffic data such as predictive volume information, weather information, jam state on the roadway, etc. during traffic operations.

The embodiments described in the present disclosure may relate to, among other things, a traffic system including machine-learning based traffic operations. In some embodiments, a highway traffic system including machine-learning based traffic operations may be controlled by affecting traffic signal controllers leading toward on-ramps to the highway traffic system and/or away from off-ramps to the highway traffic system. Additionally or alternatively, the machine-learning based traffic operations may include controlling speed limit signage posted on the highway or by communicating directly to computer systems onboard vehicles. In these and other embodiments, the number of vehicles entering the highway traffic system and the throughput of vehicles traveling on the highway traffic system may be affected by the machine-learning based traffic operations controlling traffic signal controllers and/or speed limit signage. Certain embodiments of the present disclosure may provide improvements over existing traffic systems. For example, a highway traffic system including machine-learning based traffic operations according to the present disclosure may experience higher traffic throughput in shorter periods of time. Additionally or alternatively, vehicles may spend less time on the highway traffic system to travel a given distance relative to existing highway traffic systems. Such improvements to the traffic on the highway traffic system may increase fuel savings for vehicles traveling on the highway traffic system, reduce infrastructure degradation for the highway traffic system, and/or decrease the frequency with which vehicular accidents occur on the highway traffic system.

Embodiments of the present disclosure are explained with reference to the accompanying figures.

Figure 1:
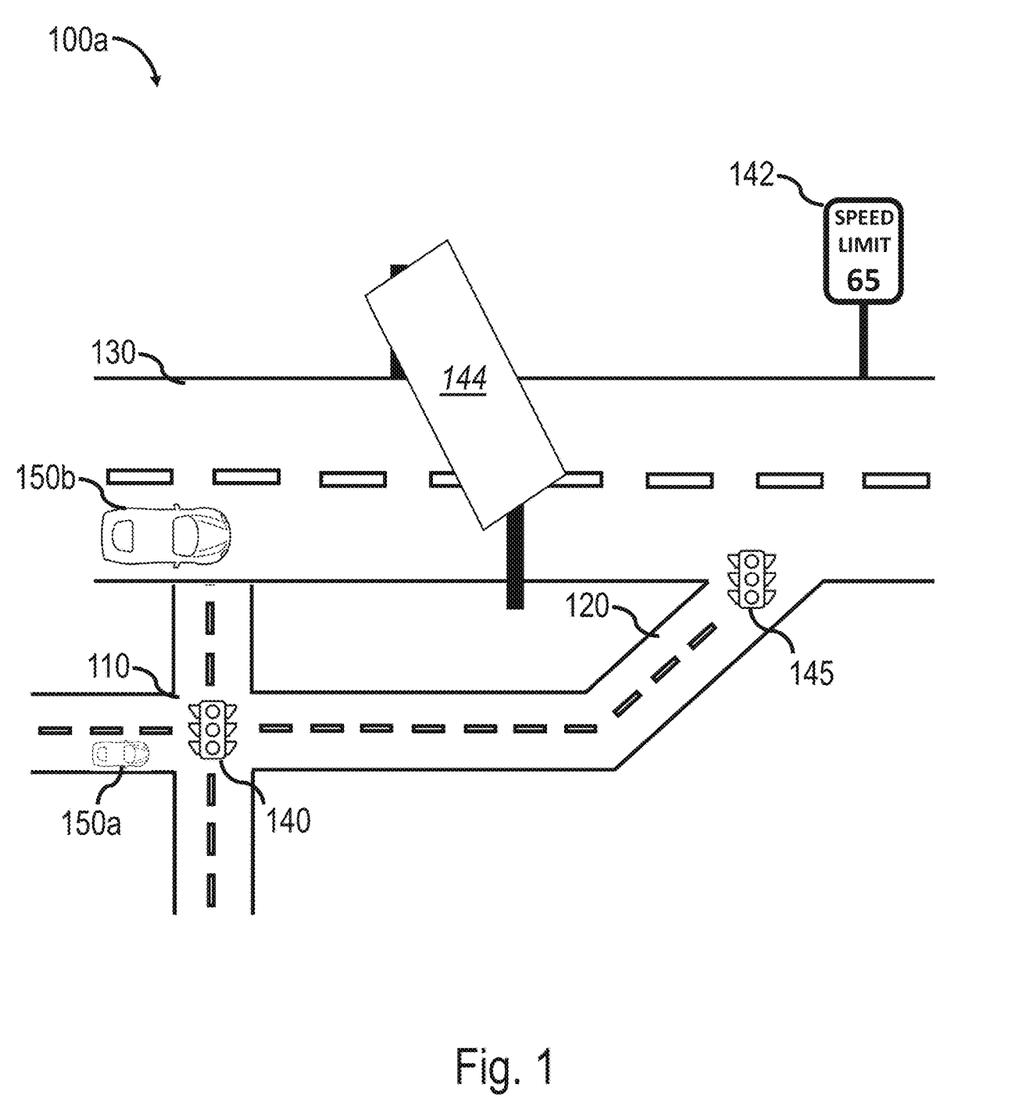
FIG. 1 illustrates a first view of an example embodiment of a traffic system according to the present disclosure.

FIG. 1 illustrates a first view of an example embodiment of a highway traffic system 100a according to the present disclosure. The highway traffic system 100a may include an intersection 110, an on-ramp 120, and/or a highway road 130. The intersection 110 may include a traffic signal controller 140 (e.g., one or more traffic lights) that control the flow of traffic at the intersection 110. The on-ramp 120 may include a ramp metering controller 145 that controls the flow of traffic entering the highway road 130. The highway road 130 may include one or more traffic control mechanisms, such as a speed limit sign 142 and/or a display board 144.

The traffic signal controller 140, the ramp metering controller 145, the speed limit sign 142, and/or the display board 144 may be modified by the highway traffic system 100a to control the number of vehicles entering and/or exiting the highway road 130 and/or the throughput of vehicles traveling on the highway road 130. In some embodiments, the traffic signal controller 140 may regulate the number of cars entering and/or exiting the highway road 130 from the section of the road connecting the intersection 110. The traffic signal controller 140 may display a green light, a yellow light, and/or a red light for set periods of time. Increasing a duration of the period of time associated with a green light in the direction parallel to the highway road 130 and/or a duration of the period of time associated with a green turn-signal light in the direction perpendicular to the highway road 130 may increase the number of vehicles entering the highway road 130. Conversely, reducing a duration of the period of time associated with the green light in the direction parallel to the highway road 130 and/or increasing a duration of the period of time associated with the green light in the direction perpendicular to the highway road 130 may decrease the number of vehicles entering the highway road 130.

Additionally or alternatively, the ramp metering controller 145 may regulate the number of cars entering the highway road 130 from the on-ramp 120. The ramp metering controller 145 may include one or more traffic signal controllers in which each of the traffic signal controllers of the ramp metering controller 145 corresponds to one or more lanes of the on-ramp 120. A given traffic signal controllers of the ramp metering controller 145 may display a green light or a red light indicating whether vehicles driving in the lane corresponding to the given traffic signal controller are permitted to enter the highway road 130. Increasing a duration of the period of time associated with a green light on the ramp metering controller 145 may increase the number of vehicles entering the highway road 130 and/or decrease traffic congestion on the on-ramp 120. However, increasing the number of vehicles entering the highway road 130 from the on-ramp 120 may also increase traffic congestion on the highway road 130 depending on the number of vehicles already traveling on the highway road 130. Conversely, reducing a duration of the period of time associated with the green light on the ramp metering controller 145 may decrease the number of vehicles entering the highway road 130, which may reduce traffic congestion on the highway road 130. In some embodiments, the ramp metering controller 145 may be activated during specific periods of the day and deactivated at other periods of the day. For example, the ramp metering controller 145 may be activated during morning and/or evening rush hour periods (e.g., 7:00 A.M. to 9:00 A.M. and/or 4:30 P.M. to 7:00 P.M.) and deactivated during all other hours of the day.

In some embodiments, the speed limit sign 142 may include a digital speed limit sign that may display different speed limit values. For example, the speed limit sign 142 may be configured to display a speed limit of 50 miles per hour (mph), 55 mph, 60 mph, 65 mph, etc. In these and other embodiments, increasing the speed limit displayed by the speed limit sign 142 may increase the throughput of vehicles in some situations. Additionally or alternatively, decreasing the speed limit displayed by the speed limit sign 142 may increase the throughput of vehicles in other situations.

In some embodiments, the display board 144 may include a digital display sign that may display text visible to drivers of vehicles traveling on the highway road 130. The text displayed on the display board 144 may provide information about the highway road 130, such as estimated travel time to off-ramps or other locations, presence of vehicular accidents further along the road, pavement conditions, road maintenance, etc.

In some embodiments, use of beacon technology may facilitate obtaining traffic data such as vehicle travel time, origin-destination data, vehicle speed, etc. In these and other embodiments, one or more beacons may be positioned in the vicinity of the highway traffic system 100a, such as along and/or on the intersection 110, the on-ramp 120, and/or the highway road 130. Aspects of obtaining traffic data using beacon technology is described in U.S. application Ser. No. 14/947,352 filed on Nov. 20, 2015, which is incorporated herein by specific reference in its entirety.

Figure 2:
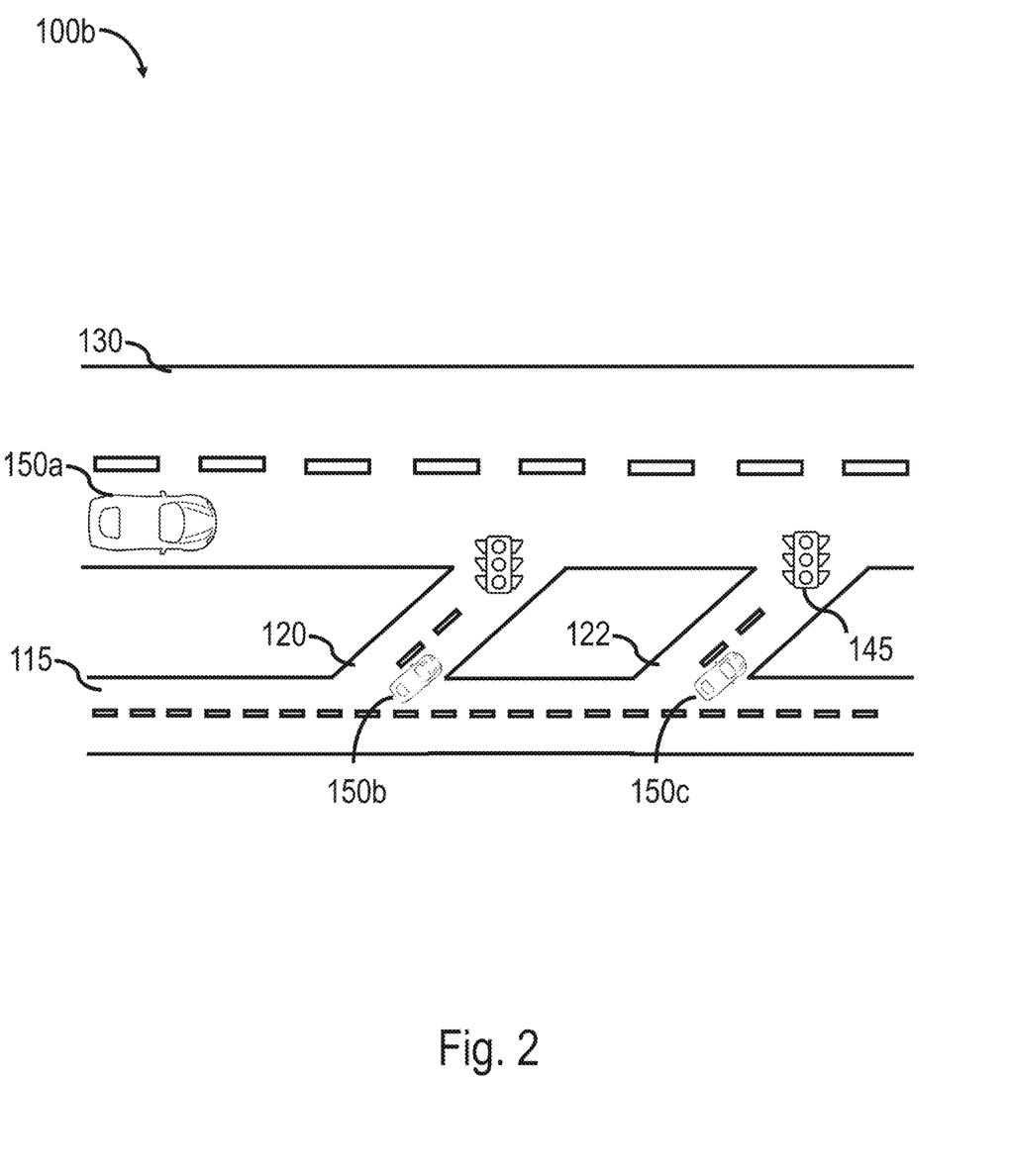
FIG. 2 illustrates a second view of the example embodiment of the traffic system according to the present disclosure.

FIG. 2 illustrates a second view of the example embodiment of a highway traffic system 100b according to the present disclosure. The highway traffic system 100b may include a service road 115 and one or more on-ramps, such as on-ramp 120 and on-ramp 122, connecting the service road 115 to the highway road 130. One or more vehicles, such as a vehicle 150a, a vehicle 150b, and/or a vehicle 150c, may enter the highway road 130 from the service road 115 via the on-ramps 120 and/or 122.

In some embodiments, traffic congestion of the highway traffic system 100b may be reduced by controlling at which ramp vehicles may enter and/or exit the highway road 130. For example, traffic congestion may be reduced by guiding vehicles 150b to enter the highway road 130 at on-ramp 120 and vehicle 150c to enter the highway road 130 at on-ramp 122. In some embodiments, determining at which ramps vehicles may enter and/or exit the highway road 130 to reduce traffic congestion may include analysis of the effects entering and/or exiting the highway road 130 at multiple on- and/or off-ramps along the highway traffic system 100b. For example, a given highway traffic system may include any suitable number of ramps. Guiding vehicles to enter and/or exit the given highway traffic system at the first and fourth ramps may have a different effect on traffic congestion on the given highway traffic system compared to guiding vehicles to enter and/or exit the given highway traffic system at the first and fifth ramps.

As the number of ramps included in the highway traffic system increases, the complexity of the traffic-reduction analysis increases such that manual control of traffic signal controllers, speed limit signs, etc. becomes less effective at reducing traffic congestion. Accordingly, in the disclosed embodiments, a machine learning model may obtain the traffic data associated with the highway traffic system and generate simulations of traffic conditions based on various combinations of on- and off-ramp traffic movement. In these and other embodiments, the machine learning model may determine one or more combinations of on- and/or off-ramp traffic movement that reduce traffic congestion.

Figure 3:
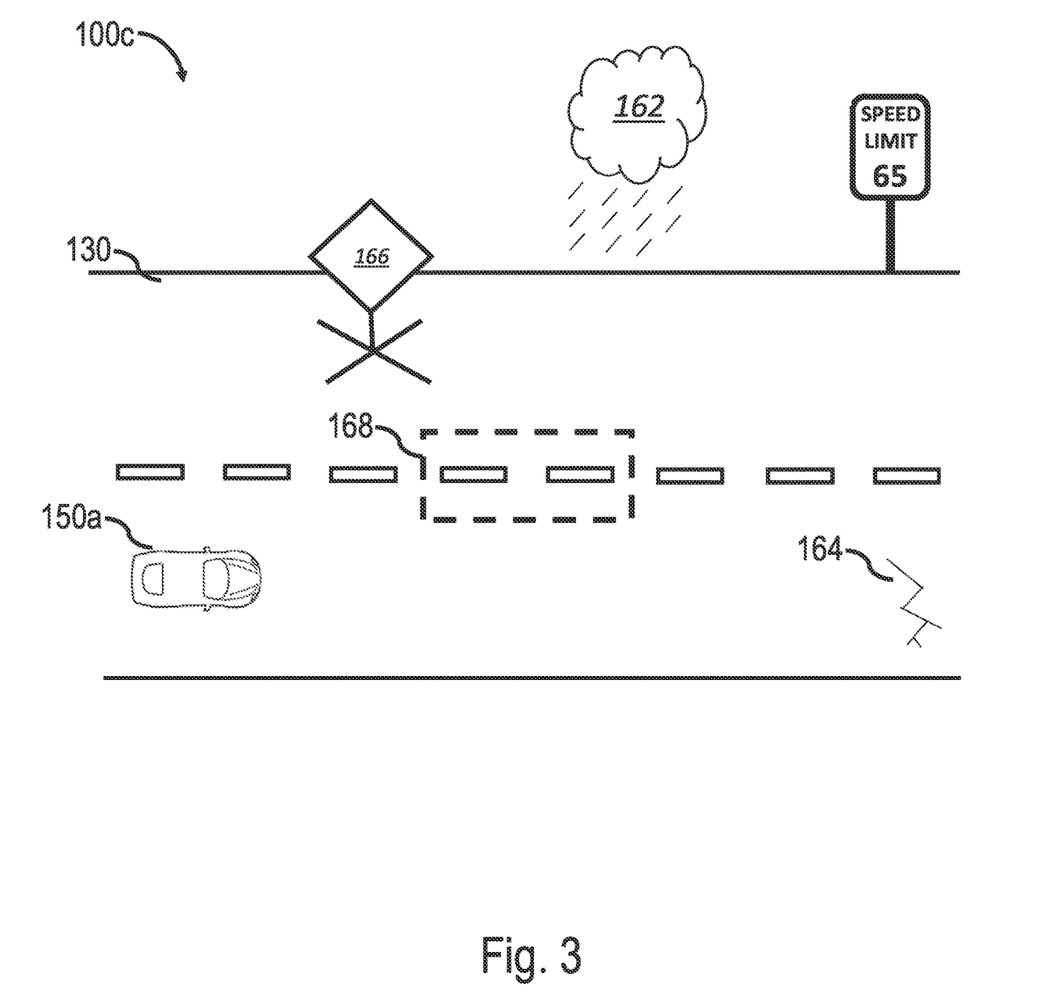
FIG. 3 illustrates a third view of the example embodiment of the traffic system according to the present disclosure.

FIG. 3 illustrates a third view of the example embodiment of the highway traffic system 100c according to the present disclosure. Analysis of the highway traffic system 100c may include identification and/or evaluation of road conditions, such as one or more weather conditions 162, one or more road defects 164, maintenance work 166, and/or road-surface markings 168 of the highway traffic system 100c. In some embodiments, reduction of traffic congestion on the highway traffic system 100c may include the identification and/or evaluation of the road conditions in addition to vehicular volume data feeds, vehicular speed data feeds, origin-destination data, etc.

In some embodiments, the weather conditions 162 may include any weather events that may affect driving on the highway traffic system 100c. For example, the weather conditions 162 may include light rain, hail, heavy rain, dust storms, snow, sleet, thunderstorms, etc. The weather conditions 162 may affect traffic congestion on the highway road 130 by reducing the speed at which vehicles travel on the highway road 130 and/or increasing the likelihood of accidents occurring. In some embodiments, the effects of the weather conditions 162 on traffic congestion may be compounded by the presence of other road conditions. For example, heavy rain and/or sleet may exasperate traffic congestion caused by the road defects 164 and/or maintenance work 166. Additionally or alternatively, snow and/or dust storms may reduce visibility of road-surface markings 168 such that the likelihood of accidents occurring increases.

In some embodiments, the road defects 164 may include any flaws and/or abnormalities in the highway road 130 that may affect driving on the highway traffic system 100c. For example, the road defects 164 may include uneven road pavement, potholes, broken rail guards, defective light poles, etc. The road defects 164 may increase traffic congestion by, for example, reducing potential vehicle throughput on the highway road 130 and/or increasing the likelihood of accidents occurring (which in turn may cause traffic congestions). As mentioned above in relation to the weather conditions 162, the effects of the road defects 164 on traffic congestion may be compounded by the presence of other road conditions.

In some embodiments, the maintenance work 166 may include roadwork being performed on the highway road 130, such as repaving of the road, widening of lanes, and/or repair of lane railings. In these and other embodiments, the maintenance work 166 may reduce the traffic throughput of the highway road 130 and increase traffic congestion on the highway road 130.

In some embodiments, the road-surface markings 168 may include the visibility of any symbols on the surface of the road that may assist a driver driving on the highway road 130. The road-surface markings 168 may include, for example, lane markers, traffic instructions, and/or raised pavement markers. The visibility of the road-surface markings 168 may aid driving on the highway road 130 such that the likelihood of accidents occurring decreases. Additionally or alternatively, decreased visibility of the road-surface markings 168 may correlate to other hazardous road conditions such as adverse weather conditions 162 and/or the presence of one or more of the road defects 164.

In some embodiments, images or videos of the highway road 130 may be used to facilitate identification of road conditions. The images of the highway road 130 may be obtained by image-processing sensors positioned near and/or on the highway road 130, such as closed-circuit television (CCTV) cameras. In these and other embodiments, features of the highway road 130, such as potholes, construction barrels, road maintenance work, puddles, striping lines, snow build-up, road icing, etc., may be identified based on the obtained images or videos.

Figure 4:
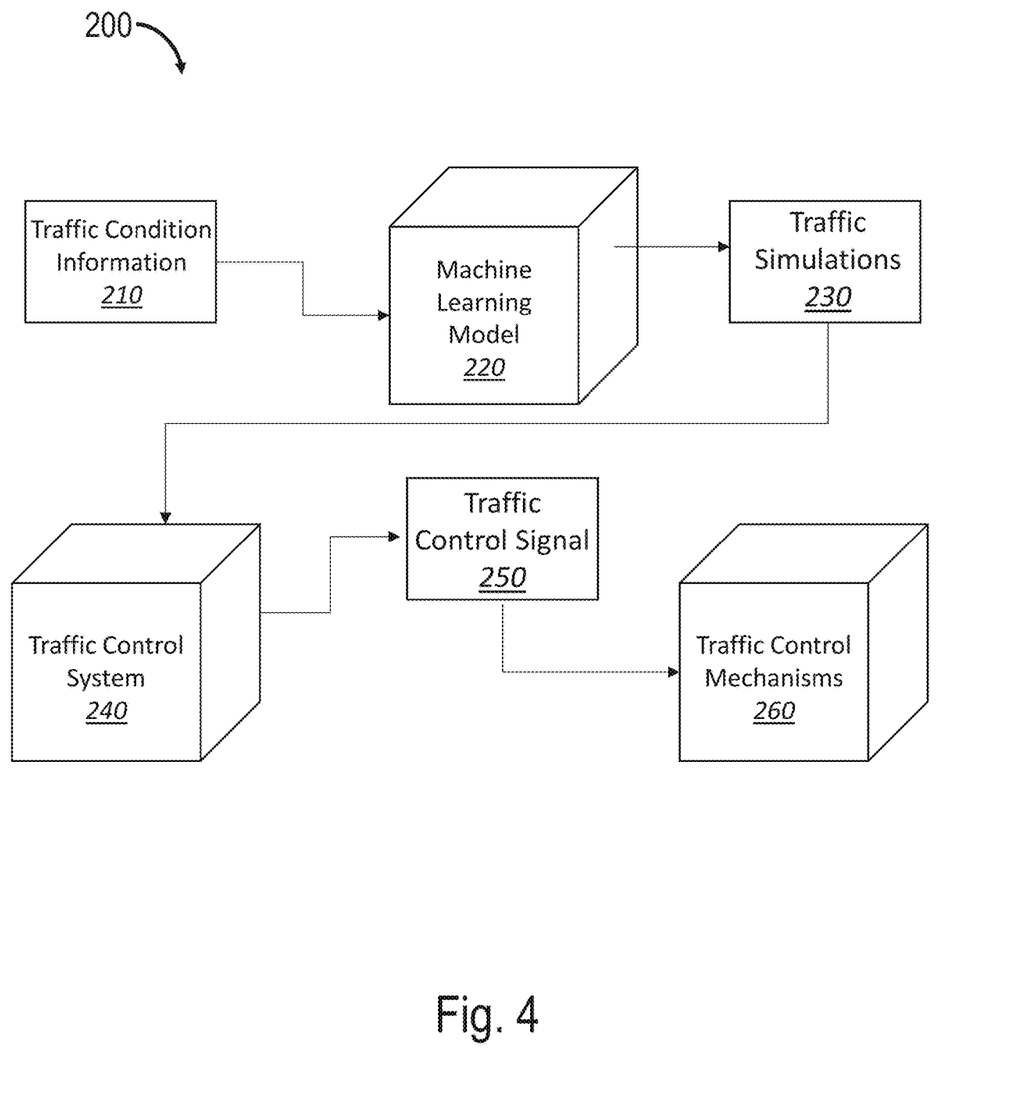
FIG. 4 shows an example embodiment of a system that may be used to simulate and predict traffic conditions.

FIG. 4 shows an embodiment of an example system 200 that may be used to simulate and predict traffic conditions. In some embodiments, a machine learning model 220 may be configured to obtain traffic condition information 210 and generate one or more traffic simulations 230 including information relating to traffic control. A traffic control system 240 may obtain one of the traffic simulations 230 and/or the information relating to traffic control associated with the one traffic simulation 230. The traffic control system 240 may output one or more traffic control signals 250, and operations of one or more traffic control mechanisms 260 may be adjusted based on the traffic control signals 250.

A given highway traffic system may experience decreased vehicular speed as the number of vehicles traveling on the given highway traffic system increases. In these and other embodiments, the machine learning model 220 and the traffic control system 240 may increase the speed and/or throughput of vehicles traveling on a highway traffic system by modifying the traffic control signals 250 such that the vehicular speed for a given vehicle density on a given highway system may increase.

In some embodiments, the machine learning model 220 may generate a number of traffic simulations 230 modeling one or more characteristics of the highway traffic system, such as travel time between ramps, maximum traffic volume capacity, potential origin-destination information for vehicles, etc. The traffic simulations 230 may identify existing road conditions and/or predict future road conditions based on the provided traffic condition information 210. Additionally or alternatively, the machine learning model 220 may determine accident-occurrence predictions and/or effects of hypothetical accidents on traffic flow, and the traffic simulations 230 may include simulated traffic controls that may mitigate the effects of the simulated accidents predicted by the machine learning model 220 on traffic congestion. Additionally or alternatively, the traffic condition information 210 may include one or more constraints for operation of the highway traffic system, such as a minimum traffic volume density, a maximum vehicular speed, a minimum vehicular speed, etc., that may be included in the traffic simulations 230. In these and other embodiments, the machine learning model 220 may be configured to consider each data point included in the traffic condition information 210 individually, all of the data points included in the traffic condition information 210 collectively, and/or some combination thereof for training and/or deployment of the machine learning model 220.

In some embodiments, the machine learning model 220 may be trained to output the traffic simulations 230 based on one or more datasets including different types of traffic condition information 210. For example, the machine learning model 220 may be trained based on GPS information associated with one or more vehicles traveling on a highway traffic system. As another example, the machine learning model 220 may be configured to obtain vehicular driving behavior data, such as hard braking occurrences, vehicular acceleration, unusual or sudden steering, etc., and the machine learning model 220 may be trained to identify and/or predict the occurrence of one or more traffic events (e.g., accidents, traffic jams, etc.) based on the vehicular driving behavior data. As another example, the machine learning model 220 may be trained based on traffic information such as video streams of the highway traffic system, traffic signal timing data, ramp meter controller data, wrong-way driver detection data, dedicated short-range communication (DSRC) data between connected vehicles, cellular-to-vehicle (C-V2X) data, etc. As another example, the machine learning model 220 may be trained based on information related to a given highway traffic system, such as social media data, construction information, and/or public safety data.

In some embodiments, the machine learning model 220 may employ machine learning algorithms and training of the machine learning model 220 may be supervised, unsupervised, or some combination thereof. For example, the machine learning model 220 may be trained using a Decision Tree, Naive Bayes Classifier, K-Nearest Neighbors, Support Vector Machines, Linear Regression, Logistic Regression, Dimensionality Reduction, and/or Artificial Neural Networks. The machine learning model 220 may be employed in any of the methods herein to perform actions with increasing effectiveness and accuracy over time, as the machine learning model learns and is periodically retrained to make more accurate predictions or decisions. For example, any of the actions in the methods disclosed herein, or any other action, may be performed by the machine learning model 220 in order to perform these actions with increasing effectiveness and accuracy over time as the machine learning model 220 learns.

Figure 5:
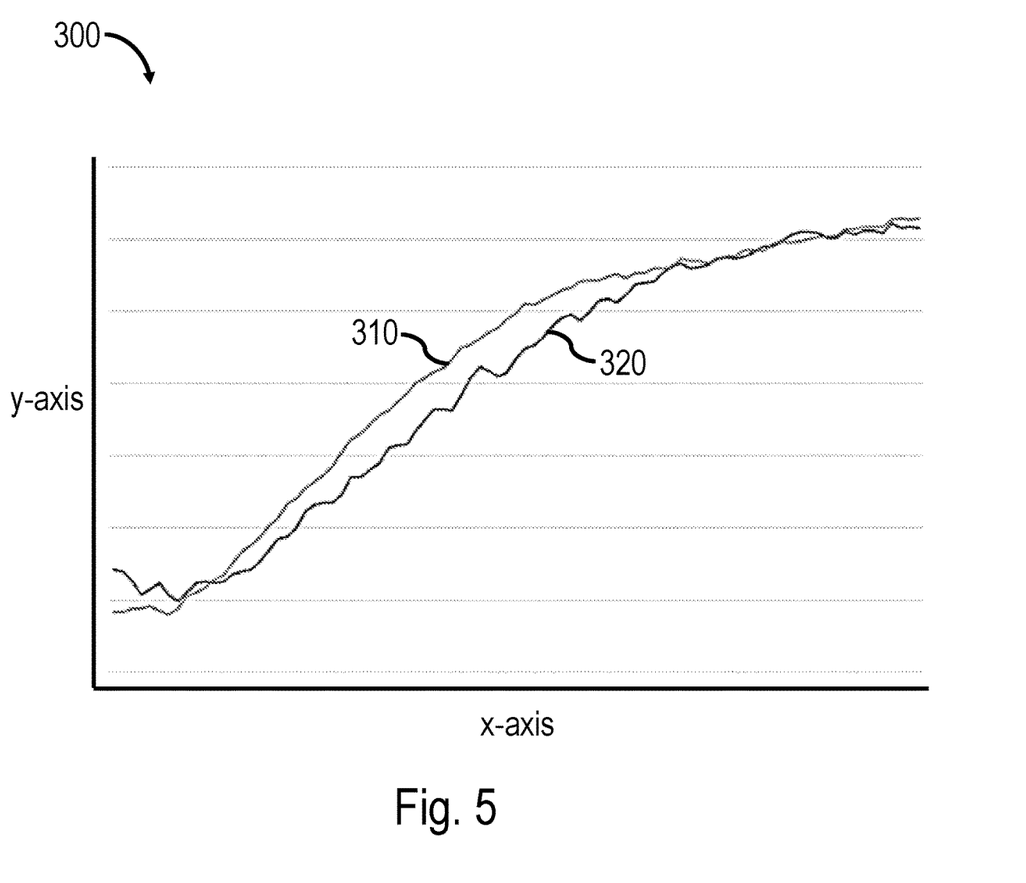
FIG. 5 illustrates the results of implementing machine-learning based traffic control according to the present disclosure.

FIG. 5 shows a graph 300 illustrating the projected results of implementing machine-learning based traffic control according to the present disclosure. The graph 300 illustrates a number of hours on the x-axis and the average delay in minutes for vehicles traveling on an interstate highway (I-15) on the y-axis. A first line graph 310 illustrates the average delay for vehicles traveling on I-15 without machine-learning based traffic controls, and a second line graph 320 illustrates the projected average delay for vehicles traveling on I-15 with machine-learning based traffic controls according to the present disclosure.

During off-hours for traffic, traffic delays may be minimal because the highway roads have not reached maximum capacity. During peak traffic hours, the number of vehicles traveling on the highway roads may approach a maximum capacity for the number of vehicles that may travel on the highway roads at a given time. Between off-hours and peak traffic hours, the difference in average delay between the first line graph 310 and the second line graph 320 is illustrated by the difference between the two line graphs and represents the potential for time saving for vehicles traveling on I-15.

Figure 6:
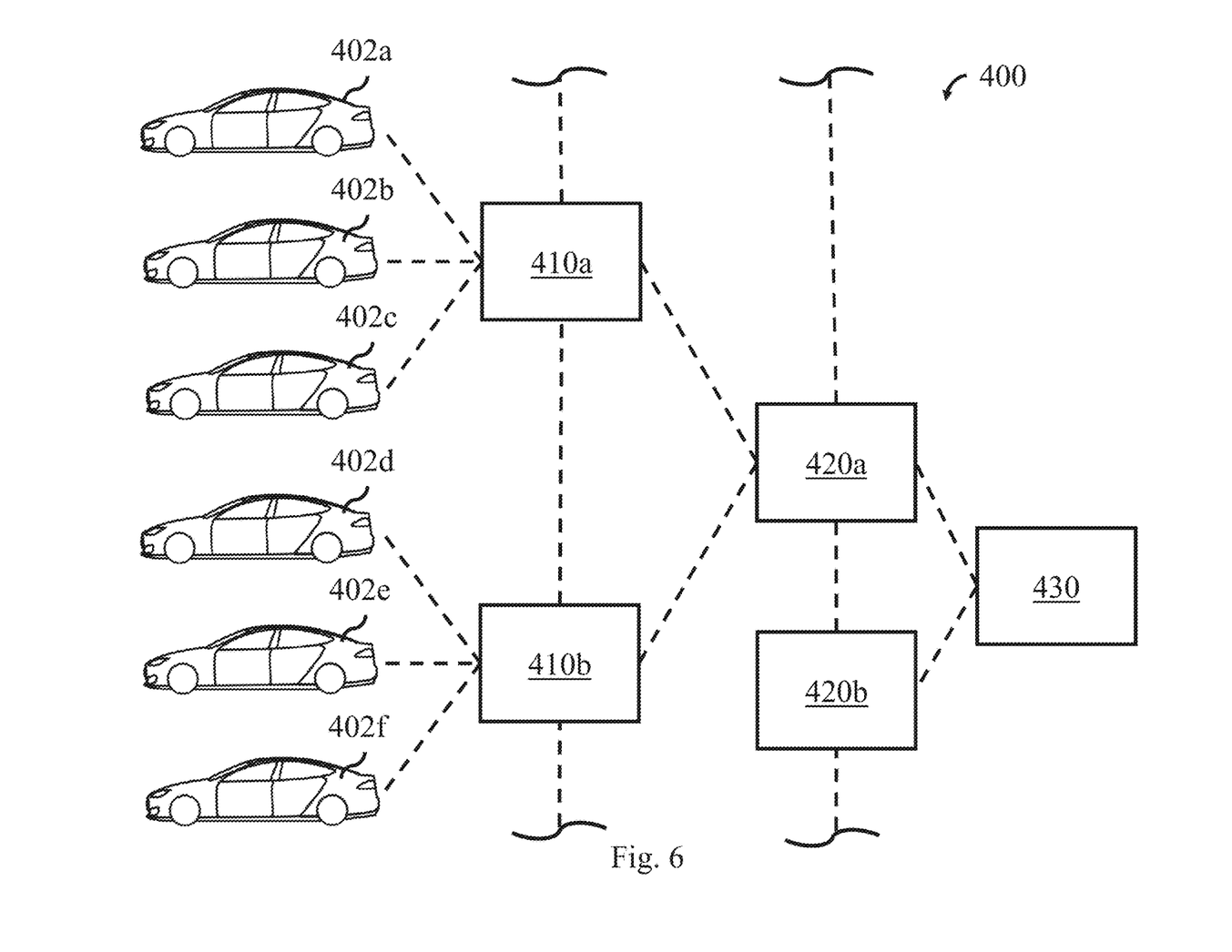
FIG. 6 is a schematic representation of an example traffic network according to the present disclosure.

FIG. 6 is a schematic representation of an example traffic network 400 according to the present disclosure. The traffic network 400 may include vehicles 402a-402f communicatively coupled to one or more roadside units (RSUs) 410a and 410b. The traffic network 400 may also include localized servers 420a and 420b communicatively coupled to the RSUs 410a and 410b. The localized server 420a may be configured to receive and process data from the RSUs 410a and 410b, and the localized server 420b may be configured to receive and process data for other RSUs, which are not illustrated for brevity. In some configurations, the localized servers 420a and 420b may be regional servers configured to process data from RSUs in specific geographic location and/or region. The localized servers 420a and 420b may be communicatively coupled to a remote server 430. In some configurations, the remote server 430 may be a cloud-based server that receives and processes data from multiple RSUs located in different geographic areas or regions.

Although the schematic representation of the traffic network 400 shown includes six vehicles 402a-402f, two RSUs 410a and 410b, two localized servers 420a and 420b, and one remote server 430, it should be appreciated that the traffic network 400 may include any suitable number of vehicles, RSUs, localized servers and/or remote servers. In addition, in other configurations some of the components shown may be omitted, and/or other components not shown may be included in the traffic network 400.

In some aspects, the described embodiments may include software on the RSUs 410. The software on the RSUs 410 may be stored in memory and executable by a processor, which may be included on the RSUs 410. Accordingly, the RSUs 410 may be configured to process data received from the vehicles 402 and/or prioritize data received from the vehicles 402. Additionally or alternatively, the described embodiments may include software on on-board units (OBUs) of the vehicles 402. The software on the OBUs may be stored in memory and executable by a processor, which may be included on the vehicles 402. Accordingly, the OBUs may be configured to process data received from the vehicles 402 and/or prioritize data received from the vehicles 402.

For example, the RSU 410 may receive a message that an airbag was deployed, indicating that one of the vehicles 402 was involved in an accident. Since this message is critical to safety, the RSU 410 may determine that the message is important and may immediately transmit the message to other vehicles in the area (e.g. the other vehicles coupled to the RSU 410). The RSU 410 may also transmit the message to the localized server 420a and/or the remote server 430, which may relay the message to emergency services, traffic operations, or other relevant entities. However, since the RSU 410 immediately transmits the message to other vehicles immediately, without first transmitting the message to the localized server 420a and/or the remote server 430 and receiving a response, the latency for other vehicles to receive the message is decreased.

In another example, the RSU 106 may receive a message that is not critical to safety, for example, a message indicating the vehicle hit a pothole. Since this message is not critical to safety, the RSU 410 may determine that the message is not important and may not transmit the message to other vehicles in the area. Instead, the RSU 410 may transmit the message to the localized server 420a and/or the remote server 430, which may relay the message to proper entities such as maintenance personnel, traffic operations, or other suitable entities. Since response time for such messages is not critical, latency for such messages may be greater, and the response may be processed by the localized server 420a and/or remote server 430, which may increase the latency. However, processing such data on the localized server 420a and/or remote server 430 but may be less resource intensive than processing and analyzing the data on the RSU 410, which may have limited processing resources.

In another aspect, the described embodiments may include software on the localized server 420a and/or the remote server 430. The software on the localized server 420a and/or the remote server 430 may be stored in memory and executable by a processor, which may be included on the localized server 420a and/or the remote server 430. Accordingly, the localized server 420a and/or the remote server 430 may be configured to process data received from the vehicles 402 and/or the prioritize data received from the vehicles 402. In some configurations, the remote server 430 may include distributed cloud resources to process the received data.

The localized server 420a and/or the remote server 430 may collect, aggregate, and process the data received from the RSUs 410 and the vehicles 402. In some configurations, the aggregated data is processed and visualized in an analytics platform. Additionally or alternatively, one or more recommendations may be sent to the vehicles 402 based on the data processed by the localized server 420a and/or the remote server 430. For example, a given recommendation may notify the vehicles 402 about an accident occurrence and/or obstruction of one or more lanes due to one or more recent accidents. As another example, a given recommendation may notify the vehicles 402 that driving at a particular speed will likely allow the vehicles 402 to drive past one or more traffic signal controllers without braking.

In some configurations, the connected traffic network 400 may be used to actively manage traffic, including adapting intersections based on real-time data exchanged via the traffic network 400. If data received from the vehicles 402 or the RSUs 410 indicates that the vehicles 402 are experiencing a delay in certain location and/or a certain direction of travel, the traffic network 400 may adapt the behavior of one or more intersections to mitigate traffic delays. For example, a delay may be caused by a car accident or an event such as a basketball game.

In some configurations, the decision of whether to process and/or aggregate data on the RSUs 410, localized servers 420 and/or the remote server 430 may depend on latency, processing and/or storage resources. In some circumstances, the remote server 430 may have more processing power and storage capabilities than the RSUs 410 and/or localized servers 420. In particular, the remote server 430 may be a cloud-based server with shared, distributed, and scalable processing resources and storage. In contrast, the RSUs 106 and/or localized servers 420 may have a fixed amount of processing resources and storage. Accordingly, it may be more efficient to perform some processing or memory-intensive tasks on the remote server 430. However, since the remote server 430 may be remotely located from the RSUs 410 and/or localized servers 420 (for example, in a different state or a different country), the latency to transmit data to and from the remote server 430 may be larger than the latency to transmit data between the RSUs 410 and the localized servers 420. Accordingly, if low latency is important for certain data or processing tasks, this data may be processed and/or stored on the RSUs 410 or the localized servers 420. Accordingly, the connected traffic network 400 may implement a distributed architecture to efficiently allocate resources according to various requirements and factors.

In some embodiments, the RSUs 410, the localized servers 420 and/or the remote server 430 may represent separate processing nodes that exchange information across distributed devices and different geographic locations. In some configurations, each of the RSUs 410, the localized servers 420 and/or the remote server 430 may process a portion of the data exchanged in the connected traffic network 400.

The RSUs 410, the localized servers 420 and/or the remote server 430 may also receive data from other sources not described above. For example, the RSUs 410, the localized servers 420 and/or the remote server 430 may receive data such as road closure data, ramp metering data, weather data, and/or other relevant data.

Figure 7:
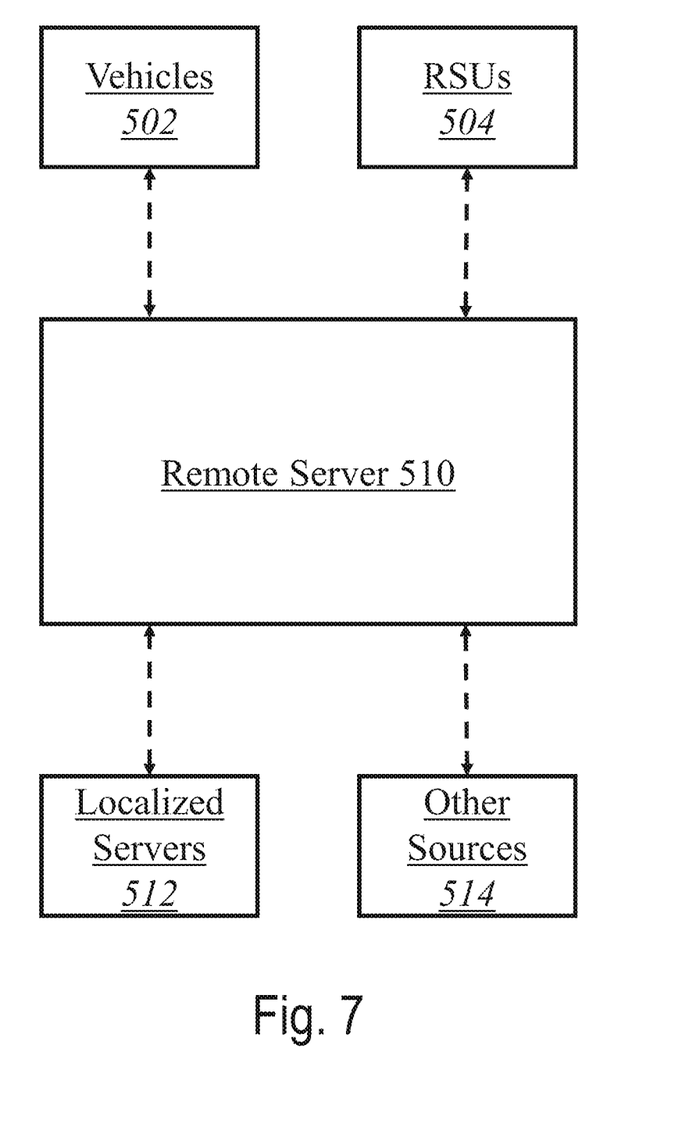
FIG. 7 is a schematic representation of a remote server according to the present disclosure.

FIG. 7 is a schematic representation of a remote server 510 according to the present disclosure. As illustrated, the remote server 510 may receive signals from the vehicles 502, the RSUs 504, the localized servers 512, and/or other sources 514. The other sources 514 may include signal trackers or other suitable aspects described in U.S. Application No. 62/082,212, U.S. Application No. 62/127,638, U.S. Application No. 62/197,462, U.S. application Ser. No. 14/947,352, and/or U.S. Application No. 62/197,464, which are hereby incorporated by specific reference in their entirety.

In some embodiments, the data may be received at the remote server 510, which may aggregate the data, use the aggregated data to identify the traffic delay, and formulate a response to be implemented by the traffic network 400 as described in relation to FIG. 4. Preparing a response to the traffic delay may include simulating different response scenarios and determining a most effective response strategy based on the simulated scenarios. The remote server 510 may transmit instructions to one or more intersections, the instructions may implement the response strategy determined by the remote server 510.

The response strategy may include changing the signal phase and timing of an intersection leading into and/or away from a highway traffic system. For example, the intersection may increase the time a green light is displayed in a certain direction to remove congestion from a location or region (e.g., the location of the car accident or an exit of the highway traffic system leading to a sports event). In some circumstances, the response strategy may include multiple intersections, so multiple intersections may increase the time a green light is displayed in a certain direction to remove congestion from a location or region. In such configurations, the traffic signals may be coordinated (for example, in sequence), so traffic is more efficiently removed from the location or region.

Although in this example the response strategy is prepared and implemented by the remote server 510, in other configurations the response strategy may be prepared and implemented by the localized server 512 or one or more of the RSUs 504. However, the remote server 510 may have increased processing and storage capabilities, and in some circumstances using the remote server 510 may be an efficient use of resources.

In some configurations, the RSU 504 may be configured to perform a method including actuating signal priority of a traffic signal controller after receiving a priority request via the RSU 504, either directly or via edge computing, conversely via a remote communication or a cloud based system. In one embodiment the system delivers intelligence. For example in an instance where there has been snow accumulation on the ground and an emergency vehicle and a snow plow both arrive at an intersection at nearly the same time, the system may determine it is in the best interest of the emergency vehicle to grant the snow plow priority to clear a path. The system may ingest data directly, for example via data feeds such as weather data, accident data or even predictive means to effectuate this sort of intelligence. In other configurations, the localized server 512 and/or the remote server 510 may be configured to perform the described aspects.

In some embodiments, the traffic network 400 may implement edge computing. Edge computing may optimize cloud computing systems by performing data processing at the edge of the network, near the source of the data, such as the RSUs 504, vehicles 502, and/or the localized servers 512. This reduces the communications bandwidth needed between sensors and the remote server 510 by performing analytics and knowledge generation at or near the source of the data. This approach may include leveraging resources that may not be continuously connected to a computer network such as laptops, smartphones, tablets, sensors (e.g., the RSUs 504 or the vehicles 502). Edge computing may include wireless sensor networks, mobile data acquisition, mobile signature analysis, cooperative distributed peer-to-peer ad hoc networking, local cloud/fog computing, grid/mesh computing, dew computing, mobile edge computing, cloudlet, distributed data storage and retrieval, autonomic self-healing networks, remote cloud services, augmented reality, and others.

The methods and systems described herein may prioritize and/or decide which computing or storage resources are used for various data in the connected vehicle traffic network. For example, the methods and systems described herein may decide whether edge computing resources, local computing resources, and/or cloud computing resources are used for certain information based on a variety of considerations, as described herein.

Figure 8:
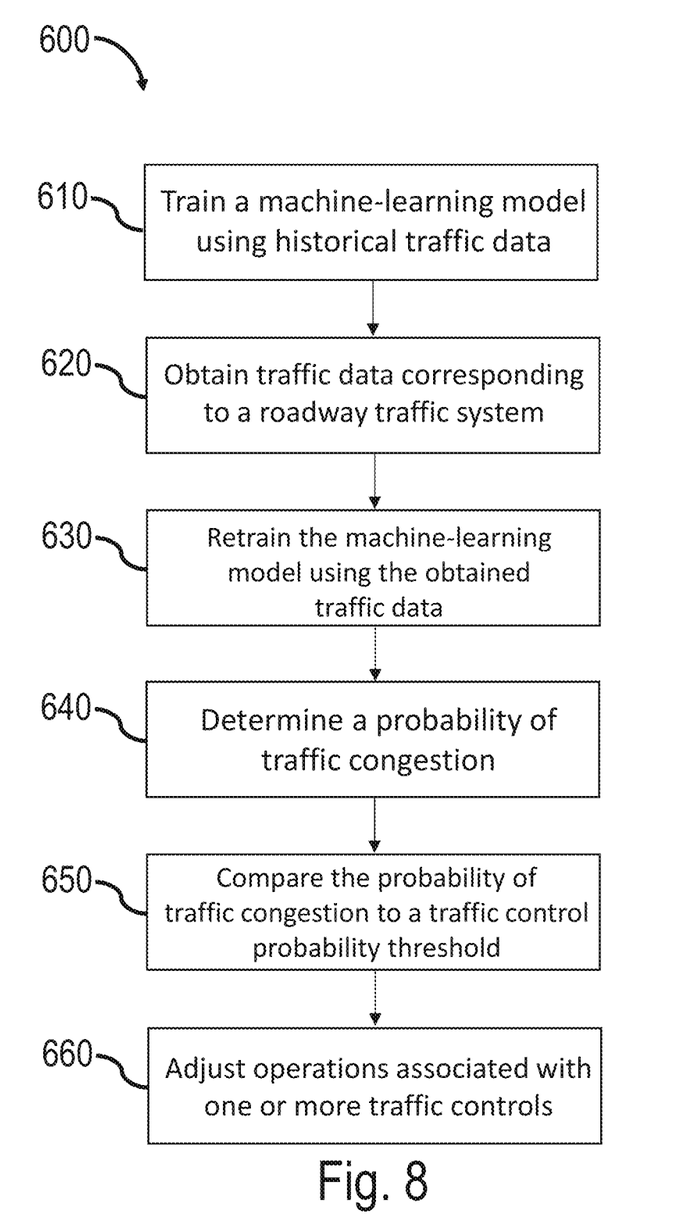
FIG. 8 is a flowchart of an example method of controlling a traffic system by adjusting one or more traffic controls according to the present disclosure.

FIG. 8 is a flowchart of an example method 600 of controlling a traffic system by adjusting one or more traffic controls according to the present disclosure. The method 600 may be performed by any suitable system, apparatus, or device. For example, the system 200, the machine learning model 220, and/or the traffic control system 240 may perform one or more of the operations associated with the method 600. Although illustrated with discrete blocks, the steps and operations associated with one or more of the blocks of the method 600 may be divided into additional blocks, combined into fewer blocks, or eliminated, depending on the particular implementation.

The method 600 may begin at block 610, where a machine learning model is trained using historical traffic data. The historical traffic data may be indicative of traffic patterns over a historical time interval, such as a week, a month, a year, two years, or any other time interval before the machine learning model is implemented in relation to a given roadway traffic system, which may be obtained from a data storage. In some embodiments, the machine learning model may be trained using any processes for training machine learning models, such as using a Decision Tree, Naive Bayes Classifier, K-Nearest Neighbors, Support Vector Machines, Linear Regression, Logistic Regression, Dimensionality Reduction, and/or Artificial Neural Networks. In these and other embodiments, the machine learning model may be trained using an unsupervised learning process involving a multimodal Gaussian process regression.

At block 620, traffic data corresponding to the roadway traffic system may be obtained. In some embodiments, the traffic data may be indicative of real-time traffic conditions on the roadway traffic system. For example, the traffic data may include average speed of vehicles traveling on the traffic system, the number of vehicles on the traffic system, average travel time of vehicles traveling on the traffic system, likely origin-destination information, occurrence of accidents, visibility of signage, visibility of striping, weather conditions, presence of road maintenance, etc. The traffic data may be obtained from one or more sensors positioned near the traffic system. For example, one or more CCTV cameras and/or radar sensors may be positioned near the traffic system to obtain the traffic data. Additionally or alternatively, the traffic data may be obtained by communicating with vehicles (i.e., via the vehicles' electronic control systems) traveling on the roadway traffic system or from external sources such as weather forecasting stations, social media, or public transportation authority feeds.

At block 630, the machine learning model may be retrained. Because traffic flow on a given roadway may differ over time due to a variety of conditions, such as due to changing local demographics, road construction, or new roadways, retraining the machine learning model continuously or periodically may improve the accuracy and relevancy of the traffic controls proposed by the machine learning model. Retraining the machine learning model may involve training the machine learning model as described in relation to the operations at block 610 with the traffic data obtained at block 620 as the training dataset. In some embodiments, the machine learning model may be continuously retrained with newly obtained traffic data. Additionally or alternatively, the obtained traffic data may be collected and batched such that the machine learning model is retrained at periodic time intervals.

At block 640, a probability of traffic congestion may be determined. The probability of traffic congestion may be an estimation indicating how likely a traffic jam or other traffic congestion event is to occur based on present traffic conditions. In some embodiments, the machine learning model may provide a reasoning for the determined probability of traffic congestion to provide interpretability of the results provided by the machine learning model. For example, the machine learning model may determine that the probability of traffic congestion is 80% based on a variety of factors included in the obtained traffic data. In this example, the machine learning model may also output one or more factors that contributed the most to the 80% probability of traffic congestion, such as a number of vehicles moving along a particular section of the road being significantly greater than average or the vehicles traveling along the particular section of the road moving at a greater speed than average.

At block 650, the probability of traffic congestion may be compared to a traffic control probability threshold. In some embodiments, the traffic control probability threshold may be set by an operating user (e.g., according to local traffic control policies). Setting a higher traffic control probability threshold may indicate that traffic controls should be implemented more conservatively (i.e., traffic controls should only be implemented when there is a greater likelihood of traffic congestion occurring), while setting a lower traffic control probability threshold may indicate that traffic controls may be used more frequently to control the flow of traffic. Additionally or alternatively, the machine learning model may be trained to automatically determine a traffic control probability threshold.

At block 660, responsive to the probability of traffic congestion exceeding the traffic control probability threshold, operations associated with one or more traffic controls corresponding to the roadway traffic system may be adjusted. In some embodiments, the traffic controls may include traffic signal controllers corresponding to intersections included near and/or in the traffic system, speed limit signage, and/or billboards visible from the traffic system. In these and other embodiments, the traffic controls may be adjusted to emulate traffic controls included in the traffic simulations. For example, a traffic congestion level predicted in a given traffic simulation may be achieved by emulating the traffic controls included in the given traffic simulation.

In some examples, operations associated with traffic controls may include adjusting a timing of traffic signal activations. A given traffic control signal unit may include a default routine in which a green light is displayed for a first duration, a yellow light is displayed for a second duration, and a red light is displayed for a third duration during a given time period (e.g., during a given hour or a given day). The operations associated with traffic controls may change the first duration, the second duration, or the third duration to change the flow of traffic for vehicles traveling before and after reaching the given traffic control signal unit. Additionally or alternatively, the operations associated with traffic controls may include specifically changing the light displayed by the given traffic control signal unit at a given point in time rather than adjusting the overall timing behavior of the given traffic control signal unit. Additional or alternative examples may include adjusting a timing or display of ramp metering signals, changing a speed limit displayed by speed limit signage, providing information about travel times or road conditions on billboards or display boards (e.g., the display board 144).

Additionally or alternatively, the operations associated with the traffic controls may include sending driving instructions to one or more vehicles using the roadway traffic system. The driving instructions may include instructions relating to, for example, increasing or decreasing the speed of the vehicles, changing the vehicles to particular lanes in the roadway traffic system, or adjusting routing of the vehicles along different streets. In some embodiments, the driving instructions may be sent to one or more vehicles using the roadway traffic system, such as via a GPS dashboard or the driver's mobile device, so that the driver may be made aware of the driving instructions as advice for improving the driver's travel time or safety. Additionally or alternatively, the driving instructions may be sent to autonomously driven vehicles using the roadway traffic system so that the autonomously driven vehicles adjust their driving behavior based on the received driving instructions.

Modifications, additions, or omissions may be made to the method 600 without departing from the scope of the disclosure. For example, the designations of different elements in the manner described is meant to help explain concepts described herein and is not limiting. Further, the method 600 may include any number of other elements or may be implemented within other systems or contexts than those described.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
   training a machine learning model using historical traffic data corresponding to a roadway traffic system and historical vehicular driving behavior data corresponding to a plurality of vehicles using the roadway traffic system, the historical traffic data being indicative of traffic patterns over a historical time interval, the historical vehicular driving behavior data being indicative of at least hard braking occurrences or sudden steering occurrences;
   obtaining, by the machine learning model, traffic data indicative of real-time traffic conditions on the roadway traffic system and vehicular driving behavior data indicative of current hard braking occurrences or sudden steering occurrences for vehicles using the roadway traffic system;
   retraining the machine learning model after a time interval using the obtained traffic data corresponding to the roadway traffic system and vehicular driving behavior data;
   determining, by the machine learning model, a probability of traffic congestion occurrence based on the obtained traffic data corresponding to the roadway traffic system and the vehicular driving behavior data, wherein the probability of traffic congestion occurrence is a measure indicating how likely a traffic jam or traffic congestion event is to occur in the future based on present traffic conditions;
   comparing the probability of traffic congestion occurrence to a traffic control probability threshold; and
   responsive to the probability of traffic congestion exceeding the traffic control probability threshold, adjusting operations associated with one or more traffic controls that correspond to the roadway traffic system.

2. The method of claim 1, wherein the traffic data corresponding to the roadway traffic system includes at least one of: travel time data corresponding to one or more vehicles between a first location along a road and a second location along the road, vehicular speed data, and occurrence of one or more traffic events.

3. The method of claim 1, wherein the traffic data corresponding to the roadway traffic system includes occurrence of one or more traffic events, and the one or more traffic events include at least one of: a consumer store promotional event, a sporting event, a social event, road construction, a lane closure, a traffic accident, a traffic jam, and an inclement weather event.

4. The method of claim 1, wherein machine learning model is configured to determine the traffic control probability threshold.

5. The method of claim 1, wherein the machine learning model is trained using a machine learning process that includes at least one of: an unsupervised multimodal Gaussian regression process, a Decision Tree process, a Naive Bayes Classifier process, a K-Nearest Neighbors process, a Support Vector Machine process, a Linear Regression process, a Logistic Regression process, a Dimensionality Reduction process, and an Artificial Neural Network process.

6. The method of claim 1, wherein the operations associated with the one or more traffic controls includes at least one of: adjusting traffic light behavior, adjusting ramp metering behavior, changing signage associated with the highway traffic system, and controlling behavior of one or more autonomous vehicles.

7. The method of claim 1, wherein the determining the probability of traffic congestion occurrence comprises:
predicting, by the machine learning model, the traffic jam or traffic congestion event is caused by an accident; and
the adjusting operations associated with the one or more traffic controls comprises:
simulating the predicted accident in the roadway traffic system;
simulating an adjustment to one or more traffic controls to mitigate the effects of the predicted accident in the roadway traffic system; and
emulating the simulated adjustment from the simulation of the predicted accident with the one or more traffic controls that correspond to the roadway traffic system.

8. The method of claim 7, wherein the one or more traffic controls include traffic signal controllers leading toward on-ramps and/or away from off-ramps in the roadway 2 traffic system, simulating the adjustment to one or more traffic controls comprises simulations traffic conditions based on combinations of on- and off-ramp traffic, and the adjusting operations associated with the one or more traffic controls comprises adjusting on- and off-ramp traffic.

9. One or more non-transitory computer-readable storage media configured to store instructions that, in response to being executed, cause a system to perform operations, the operations comprising:
training a machine learning model using historical traffic data corresponding to a roadway traffic system and historical vehicular driving behavior data corresponding to a plurality of vehicles using the roadway traffic system, the historical traffic data being indicative of traffic patterns over a historical time interval, the historical vehicular driving behavior data being indicative of at least hard braking occurrences or sudden steering occurrences;
obtaining, by the machine learning model, traffic data indicative of real-time traffic conditions on the roadway traffic system and vehicular driving behavior data indicative of current hard braking occurrences or sudden steering occurrences for vehicles using the roadway traffic system;
retraining the machine learning model after a time interval using the obtained traffic data and vehicular driving behavior data;
determining, by the machine learning model, a probability of traffic congestion occurrence based on the obtained traffic data corresponding to the roadway traffic system and the vehicular driving behavior data, wherein the probability of traffic congestion occurrence is a measure indicating how likely a traffic jam or traffic congestion event is to occur in the future based on present traffic conditions;
comparing the probability of traffic congestion occurrence to a traffic control probability threshold; and
responsive to the probability of traffic congestion exceeding the traffic control probability threshold, adjusting operations associated with one or more traffic controls that correspond to the roadway traffic system.

10. The one or more non-transitory computer-readable storage media of claim 9, wherein the traffic data corresponding to the roadway traffic system includes at least one of: travel time data corresponding to one or more vehicles between a first location along a road and a second location along the road, vehicular speed data, and occurrence of one or more traffic events.

11. The one or more non-transitory computer-readable storage media of claim 9, wherein the traffic data corresponding to the roadway traffic system includes occurrence of one or more traffic events, and the one or more traffic events include at least one of: a consumer store promotional event, a sporting event, a social event, road construction, a lane closure, a traffic accident, a traffic jam, and an inclement weather event.

12. The one or more non-transitory computer-readable storage media of claim 9, wherein machine learning model is configured to determine the traffic control probability threshold.

13. The one or more non-transitory computer-readable storage media of claim 9, wherein the machine learning model is trained using a machine learning process that includes at least one of: an unsupervised multimodal Gaussian regression process, a Decision Tree process, a Naive Bayes Classifier process, a K-Nearest Neighbors process, a Support Vector Machine process, a Linear Regression process, a Logistic Regression process, a Dimensionality Reduction process, and an Artificial Neural Network process.

14. The one or more non-transitory computer-readable storage media of claim 9, wherein the operations associated with the one or more traffic controls includes at least one of: adjusting traffic light behavior, adjusting ramp metering behavior, changing signage associated with the highway traffic system, and controlling behavior of one or more autonomous vehicles.

15. A method comprising:
obtaining, by a machine learning model, traffic data corresponding to a roadway traffic system and vehicular driving behavior data corresponding to a plurality of vehicles using the roadway traffic system;
determining, by the machine learning model, a probability of traffic congestion occurrence based on the obtained traffic data corresponding to the roadway traffic system and the vehicular driving behavior, wherein the probability of traffic congestion occurrence is determined at least in part on a prediction of an accident causing a traffic jam or traffic congestion event;

comparing the probability of traffic congestion occurrence to a traffic control probability threshold; and responsive to the probability of traffic congestion exceeding the traffic control probability threshold, adjusting operations associated with one or more traffic controls that correspond to the roadway traffic system, wherein the adjusting operations includes simulating the predicted accident in the roadway traffic system;

simulating an adjustment to one or more traffic controls to mitigate the effects of the predicted accident in the roadway traffic system; and emulating the simulated adjustment from the simulation of the predicted accident with the one or more traffic controls that correspond to the roadway traffic system.

16. The method of claim 15, wherein the one or more traffic controls include traffic signal controllers leading toward on-ramps and/or away from off-ramps in the roadway traffic system, simulating the adjustment to one or more traffic controls comprises simulating traffic conditions based on combinations of on- and off-ramp traffic, and the adjusting operations associated with the one or more traffic controls comprises adjusting on- and off-ramp traffic.

17. The method of claim 15, wherein the adjusting operations associated with the one or more traffic controls comprises adjusting traffic light behavior.

18. The method of claim 15, wherein the adjusting operations associated with the one or more traffic controls comprises changing signage associated with the highway traffic system.

19. The method of claim 15, wherein the adjusting operations associated with the one or more traffic controls comprises controlling behavior of one or more autonomous vehicles.

20. The method of claim 15, wherein machine learning model is configured to determine the traffic control probability threshold.

* * * * *

UNITED STATES PATENT AND TRADEMARK OFFICE
CERTIFICATE OF CORRECTION

PATENT NO. : 12,020,566 B2
APPLICATION NO. : 17/664366
DATED : June 25, 2024
INVENTOR(S) : Mark Eric Pittman et al.

Page 1 of 1

It is certified that error appears in the above-identified patent and that said Letters Patent is hereby corrected as shown below:

In the Claims

Claim 8:
Column 15, Line 46 should read:
on-ramps and/or away from off-ramps in the roadway Signed and Sealed this
Eighteenth Day of March, 2025

Coke Morgan Stewart
*Acting Director of the United States Patent and Trademark Office*